United States Patent
Tsuchiya et al.

(10) Patent No.: US 8,170,769 B2
(45) Date of Patent: May 1, 2012

(54) VEHICLE SPEED CONTROL SYSTEM

(75) Inventors: Kazutoshi Tsuchiya, Hitachinaka (JP); Masato Imai, Hitachinaka (JP); Hiroshi Sakamoto, Hitachi (JP); Takaomi Nishigaito, Kasumigaura (JP); Mikio Ueyama, Ohira (JP)

(73) Assignee: Hitachi, Ltd., Tokyo (JP)

( * ) Notice: Subject to any disclaimer, the term of this patent is extended or adjusted under 35 U.S.C. 154(b) by 838 days.

(21) Appl. No.: 12/194,767

(22) Filed: Aug. 20, 2008

(65) Prior Publication Data
US 2009/0088941 A1 Apr. 2, 2009

(30) Foreign Application Priority Data
Sep. 27, 2007 (JP) .................. 2007-250389

(51) Int. Cl.
*B60K 31/00* (2006.01)
(52) U.S. Cl. ........................... 701/93; 701/70
(58) Field of Classification Search .................. 701/93, 701/96, 300, 208, 209, 70, 110, 213; 340/905; 180/170–179
See application file for complete search history.

(56) References Cited

U.S. PATENT DOCUMENTS

| | | | |
|---|---|---|---|
| 5,673,039 A * | 9/1997 | Pietzsch et al. ............... | 340/905 |
| 7,337,055 B2 | 2/2008 | Matsumoto et al. | |
| 7,739,023 B2 * | 6/2010 | Lee ................................. | 701/96 |

FOREIGN PATENT DOCUMENTS

| | | |
|---|---|---|
| EP | 0 798 150 A2 | 10/1997 |
| JP | 2004-142686 A | 5/2004 |
| JP | 2006-309966 A | 11/2005 |
| JP | 2006-111184 | 4/2006 |
| WO | WO 2007/070160 A2 | 6/2007 |

OTHER PUBLICATIONS

Extended European Search Report dated Jan. 5, 2009 (Five (5) pages).
Japanese Office Action dated Jul. 10, 2009.
Japanese Office Action dated Oct. 19, 2009.

* cited by examiner

*Primary Examiner* — Richard M. Camby
(74) *Attorney, Agent, or Firm* — Crowell & Moring LLP

(57) ABSTRACT

A vehicle speed control system includes a road shape recognition unit which recognizes a road shape, a target speed setting unit which sets a target speed according to the road shape, a speed control unit which controls the host vehicle's speed according to the target speed, a parameter detecting unit which detects at least one of parameters representing the driver's steering rotation, a yaw rate of the host vehicle, and a lateral acceleration of the host vehicle, and a first acceleration determining unit which, after the speed control unit has decelerated, determines whether or not to accelerate the host vehicle according to reference parameters based on a road shape and the host vehicle's speed and parameters detected by the parameter detecting unit, wherein if the first acceleration determining unit has determined to accelerate, the target speed setting unit sets a target speed of the host vehicle according to a predetermined acceleration.

11 Claims, 11 Drawing Sheets

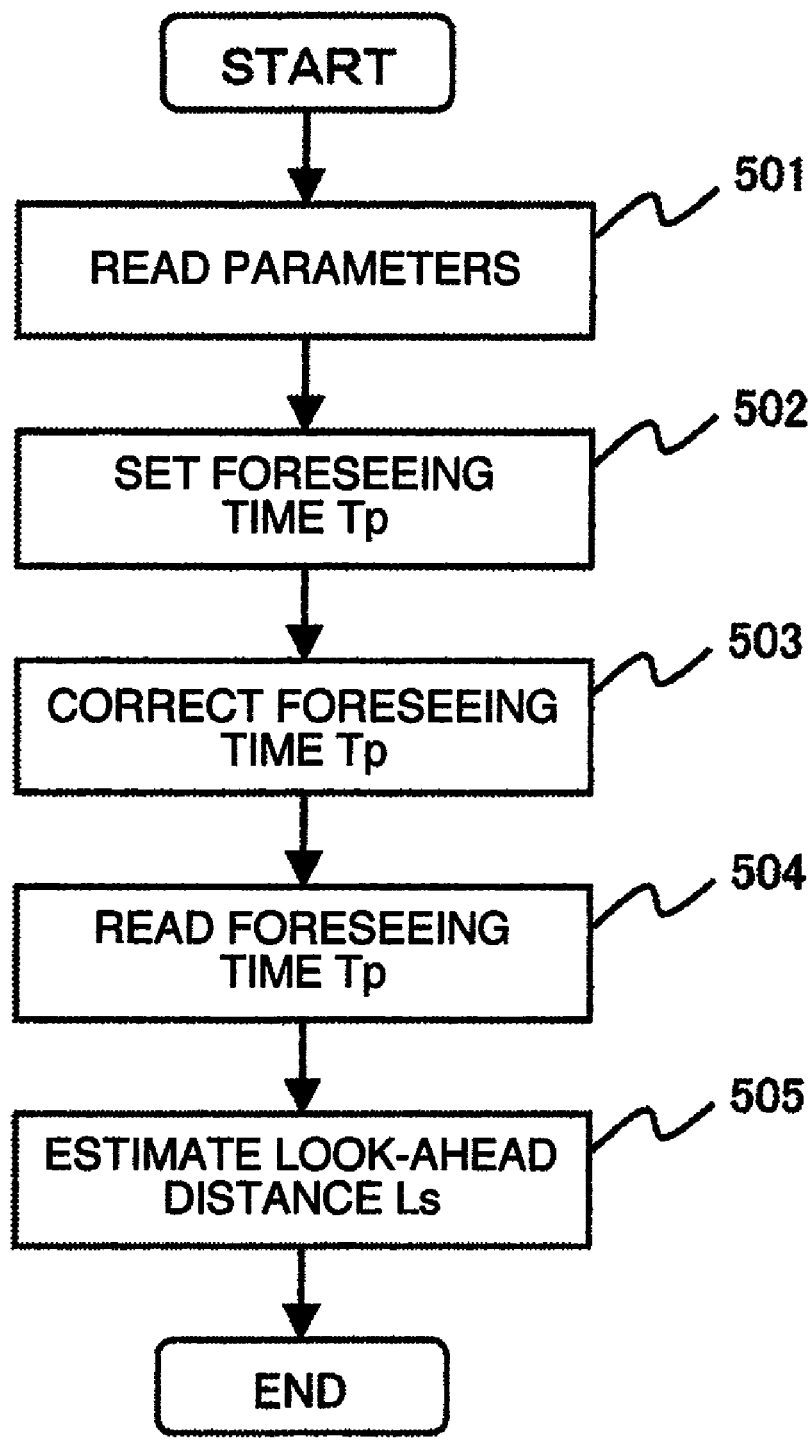

FIG. 6

| SETTING | SETTING METHOD OF FORESEEING TIME T | FORESEEING TIME Tp | | | | | |
|---|---|---|---|---|---|---|---|
| SET BY DRIVER | SELECT AT LEAST ONE FORESEEING TIME Tp IN A RANGE OF 1.0~2.0 [sec] | Tp=1.0/1.1/1.2/1.3/1.4/1.5/1.6/1.7/1.8/1.9/2.0[sec] | | | | | |
| SET AUTOMATICALLY | SELECT AT LEAST ONE FORESEEING TIME Tp FROM EACH DRIVING PATTERN | | DRIVING PATTERN 1 | DRIVING PATTERN 2 | DRIVING PATTERN 3 | DRIVING PATTERN 4 | DRIVING PATTERN 5 |
| | | VSP[km/h] / L[m] | 0<VSP<Va | Va≦VSP<Vc | Vc≦VSP<Ve | Ve≦VSP<Vg | Vg≦VSP |
| | A TABLE IS FORMED TO SHOW COMBINATIONS BETWEEN CURRENT VEHICLE SPEED VSP AND CURVE LENGTH L. A PREDETERMINED FORESEEING TIME T IS TO BE ADOPTED | 0≦L<Li | 1.6[sec] | 1.4[sec] | 1.2[sec] | 1.0[sec] | 1.0[sec] |
| | | Li≦L<Lj | 1.6[sec] | 1.6[sec] | 1.4[sec] | 1.2[sec] | 1.0[sec] |
| | | Lj≦L<Lk | 1.8[sec] | 1.6[sec] | 1.6[sec] | 1.4[sec] | 1.2[sec] |
| | | Lk≦L<Lm | 1.8[sec] | 1.8[sec] | 1.6[sec] | 1.6[sec] | 1.4[sec] |
| | | Lm≦L | 1.8[sec] | 1.8[sec] | 1.8[sec] | 1.6[sec] | 1.6[sec] |

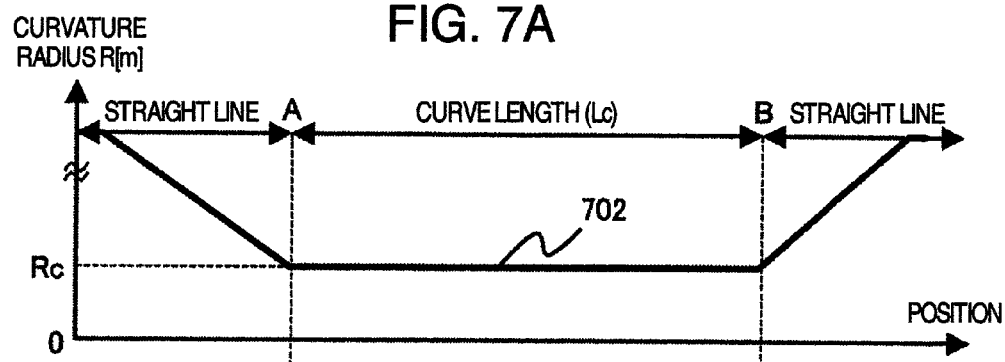
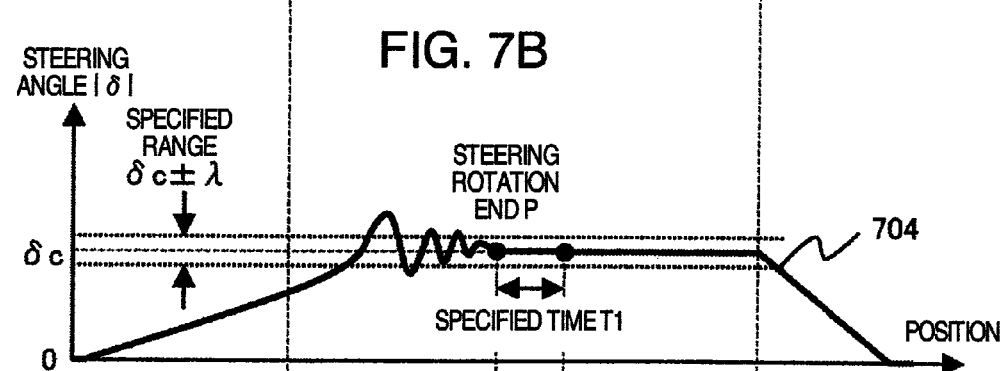
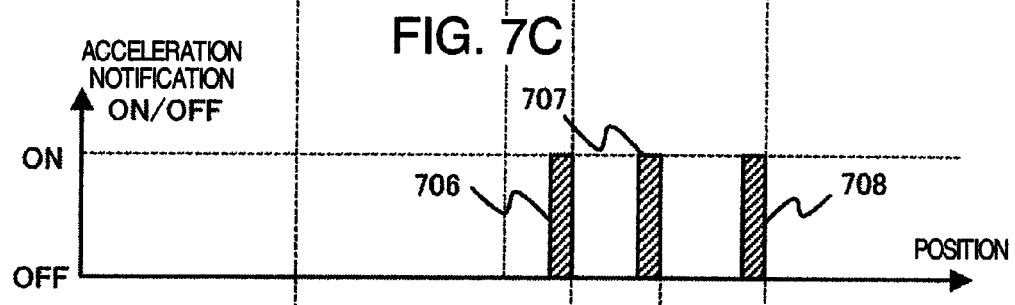
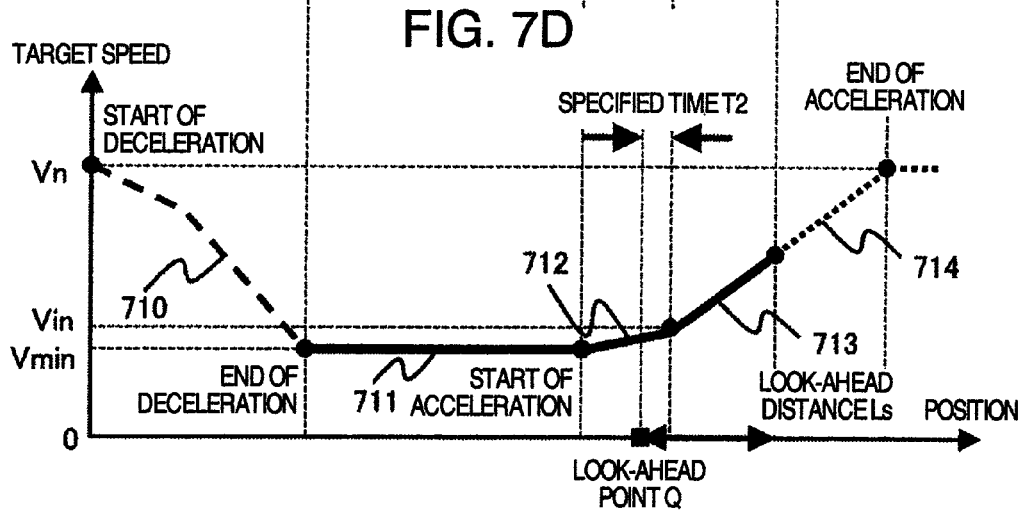

US 8,170,769 B2

VEHICLE SPEED CONTROL SYSTEM

BACKGROUND OF THE INVENTION

The present invention relates to a vehicle speed control system.

In the field of vehicle speed control, there are a technology that prevents traffic accidents by providing support to vehicles cruising along a curve and in the neighborhood of the curve where accidents often occur and another technology that improves the safety and the comfort of the driver when driving support is provided, and these technologies are configured by utilizing automotive cruise control technology, such as adaptive cruise control (ACC).

There is yet another technology that determines a target speed based on information about the road ahead of the host vehicle, and executes a two-step deceleration that simulates the driver's operation in order to provide the driver with a driving comfort during deceleration before entering a curve section (JP-A-2004-142686).

Furthermore, there is a technology that, before entering a curve under the current running condition, estimates a load on the driver while passing through the curve based on the running condition of the host vehicle and the road shape ahead of the host vehicle, and if a deviation of the estimated driving load from a reference value is larger than a threshold value, issues a warning and implements deceleration control with appropriate timing, to thereby provide the driver with a driving comfort while running through a curve (JP-A-2005-309955).

SUMMARY OF THE INVENTION

In JP-A-2004-142686, as a result of focusing attention on the driver's motion in deceleration before entering a curve, a deceleration method including deceleration in two steps was adopted to improve the driving comfort to the driver during deceleration before entering a curve. However, no consideration was taken for improvement of the comfort to the driver by implementing acceleration control while the vehicle is running along the curve and coming out of it.

In JP-A-2005-309955, this technology is intended to estimate, before entering a curve, the driver's load while the vehicle passes through a curve and issue a warning and implement deceleration control to thereby reduce the driving load while traveling around a curve. However, no consideration was taken to improve the driver's comfort during acceleration while the vehicle is running along and getting out of a curve.

According to the present invention, it is possible to provide a vehicle speed control system configured to improve the comfort to the driver when the vehicle is accelerated as it drives through and out of a curve.

A preferable embodiment of the present invention is described below.

A vehicle speed control system comprises a road shape recognition unit which recognizes a shape of a road; a target speed setting unit which sets a target speed according to the shape of a road; a speed control unit which controls a vehicle's speed according to the target speed; a parameter detecting unit which detects at least one of parameters representing the driver's steering rotation, a yaw rate of the host vehicle, and a rate of lateral acceleration of the host vehicle; and a first acceleration determining unit which, after the speed control unit has decelerated the host vehicle, determines whether or not to accelerate the host vehicle according to reference parameters based on the road shape and the host vehicle's speed and also parameters detected by the parameter detecting unit, wherein if the first acceleration determining unit has determined to accelerate the host vehicle, the target speed setting unit sets a target speed of the host vehicle according to a predetermined rate of acceleration.

According to the present invention, it is possible to provide a vehicle speed control system that improves the comfort to the driver during acceleration when driving through and coming out of a curve.

Other objects, features and advantages of the invention will become apparent from the following description of the embodiments of the invention taken in conjunction with the accompanying drawings.

BRIEF DESCRIPTION OF THE DRAWINGS

FIG. 5 is a flowchart of a look-ahead distance estimating unit.

FIG. 6 is a chart showing an example of a foreseeing time selection method.

FIGS. 7A to 7D are diagrams showing an example of acceleration control of the host vehicle.

DETAILED DESCRIPTION OF THE EMBODIMENT

An embodiment of the present invention will be described with reference to the accompanying drawings.

Figure 1:
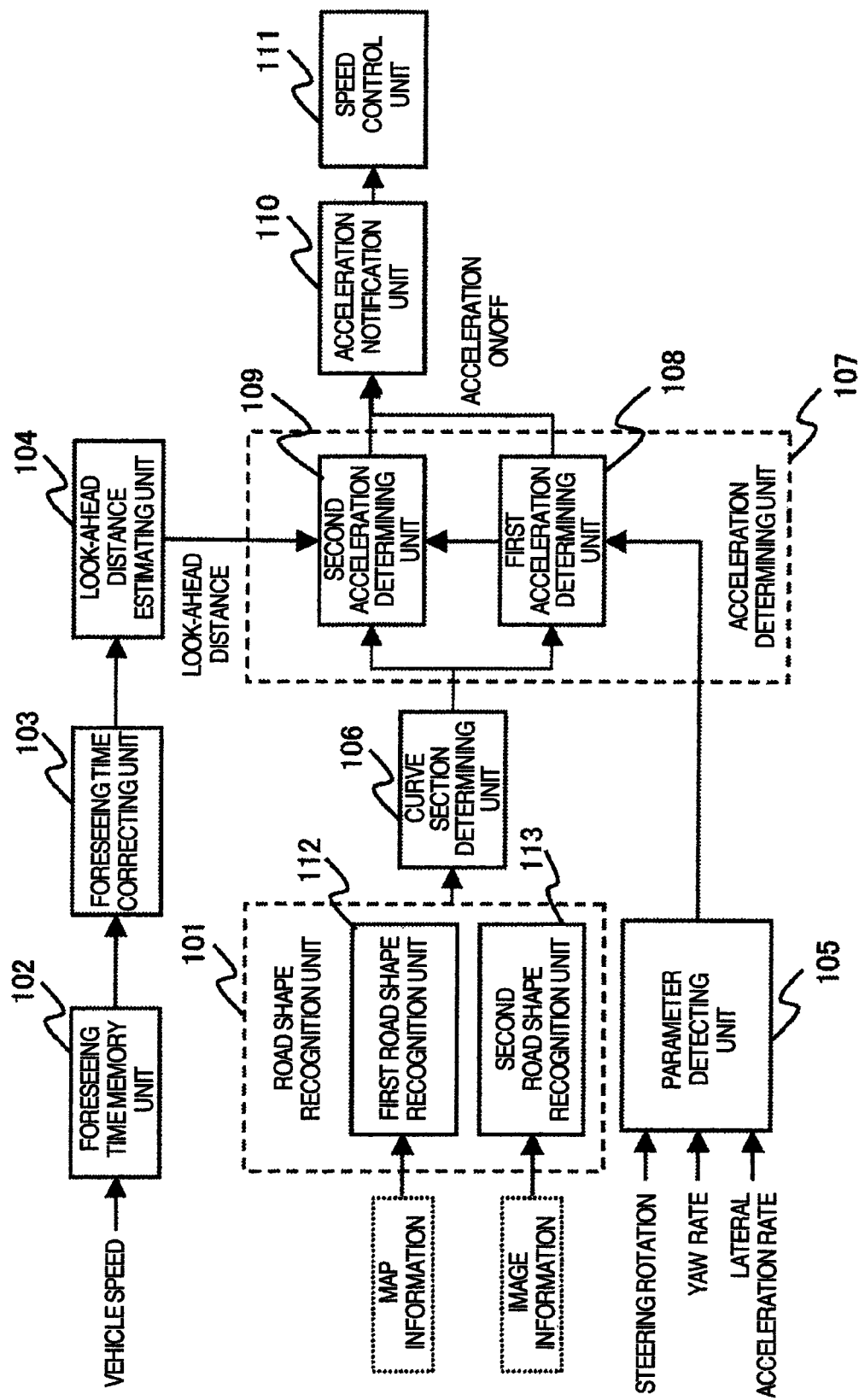
FIG. 1 is a block diagram showing the contents of the process of the present invention.

FIG. 1 is a block diagram showing the contents of the process in the present invention. The contents of the process are programmed in a computer installed on board a vehicle, and are executed repeatedly at predetermined periods.

A road shape recognition unit 101 includes a first road shape recognizing unit 112 configured to recognize the road geometry according to map information, host-vehicle position information, and road information about the surrounding area of the host vehicle, provided by a car navigation system, for example, and a second road shape recognizing unit 113 configured to recognize the road shape according to image information from a camera, and information about recognized road shape is output to a curve-section determining unit 106. Besides image information by a camera, a radar (laser, millimeter wave, infrared radiation) may be used to obtain information to recognize the road shape. The road shape that the road shape recognition unit 101 refers to, for example, curvature radius of the road, a distance between change-points in curvature radius, a distance from the host vehicle position to the distance between the change-points in curvature, a road inclination (tilt angle), a surface friction coefficient, a regulatory speed, road surface signs, such as stop-lines and pedestrian crossings.

A foreseeing time memory unit 102 stores foreseeing times. As a storage medium, a random access memory (RAM) installed in the computer is generally used. Foreseeing times are previously stored at 0.1-second intervals in a range from 1.0 to 2.0 seconds. The foreseeing times stored in the foreseeing time memory unit 102 can be changed by the driver.

A foreseeing time correction unit 103 stores at least one of a plurality of parameters representing the host vehicle's speed, the driver's steering rotation, and the driver's accelerator operation amount, and corrects a foreseeing time stored in the foreseeing time memory unit according to a selected parameter and a road shape recognized by the road shape recognition unit 101. Thus, by correcting foreseeing time based on parameters related to the running condition of the host vehicle and also based on the road shape, it is possible to estimate a foreseeing time according to the characteristics of individual drivers. As parameters for correcting a foreseeing time, a yaw rate, a rate of lateral acceleration, or the like may be used. Note that foreseeing times stored in the foreseeing time memory unit 102 may be updated to foreseeing times corrected by the foreseeing time correcting unit 103.

A look-ahead distance estimating unit 104 estimates a look-ahead distance according to a foreseeing time, corrected by the foreseeing time correcting unit 103, and host vehicle's speed. Besides a foreseeing time corrected by the foreseeing time correcting unit 103, foreseeing times stored in the foreseeing time memory unit 102 may be used.

A parameter detecting unit 105 detects at least one parameter out of parameters, such as a driver's steering rotation, and a yaw rate and a rate of lateral acceleration of the vehicle. Besides those parameters, the driver's accelerator operation amount and brake operation amount may be detected.

A curve-section determining unit 106 determines whether the host vehicle is within a curve section or not based on a road shape ahead of the host vehicle, which is recognized by the road shape recognition unit 101. The curve section here refers to a curve section where the radius of curvature recognized by the road shape recognition unit 101 is a fixed value.

An acceleration determining unit 107 includes a first acceleration determining unit 108 configured to determine whether or not to perform first acceleration according to the driver's steering rotation detected by the parameter detecting unit 105, and a second acceleration determining unit 109 configured to determine whether or not to perform second acceleration according to a look-ahead distance estimated by the look-ahead distance estimating unit 104. In the final analysis, whether or not to accelerate the host vehicle is determined according to a road shape, and the driver's steering rotation and a look-ahead distance. For example, after the first acceleration is started according to the road shape ahead of the host vehicle recognized by the road shape recognition unit 101 and the driver's steering rotation amount detected by the parameter detecting unit 105, a decision is made to determine whether to perform second acceleration according to the road shape recognized by the road shape recognition unit 101 and the look-ahead distance estimated by the look-ahead distance estimating unit 104.

The first acceleration here refers to a partial acceleration in such a manner that the driver deactivates the brake and places a leg on the accelerator pedal, and the second acceleration refers to full acceleration performed by the driver. Incidentally, depending on the road shape ahead of the host vehicle, a decision may be made whether to perform second acceleration based on the driver's steering rotation. Similarly, a decision may be made whether to perform first acceleration based on a road shape ahead of the host vehicle and a look-ahead distance.

When the acceleration determining unit 107 has determined to accelerate the host vehicle by first acceleration or second acceleration, an acceleration notification unit 110, before the host vehicle accelerates, notifies the driver that the host vehicle will accelerate by using at least one of a display screen, a sound or an alarm on an on-board terminal device. With regard to the display screen of the on-board terminal device, a car navigation display, a speed display on the instrument panel or a head-up display may be used instead. For the sound generation, a warning sound such as a peep sound or a message that "The car is going to accelerate." may be used.

The speed control unit 111 sets a target speed for the host vehicle according to a road shape recognized by the road recognition unit 101, parameters detected by the parameter detecting unit 105, and a look-ahead distance estimated by the look-ahead distance estimating unit 104, and controls the speed of the host vehicle based on a set target speed. More specifically, the speed control unit 111 performs deceleration control when the host vehicle enters a curve, performs control while the host vehicle passes through a curve section, and performs acceleration control when the host vehicle comes out of a curve section, for example. Further, when there is a preceding vehicle in front of the host vehicle, the speed control unit 111 performs speed control according to an inter-vehicular distance relative to the preceding vehicle.

Figure 2:
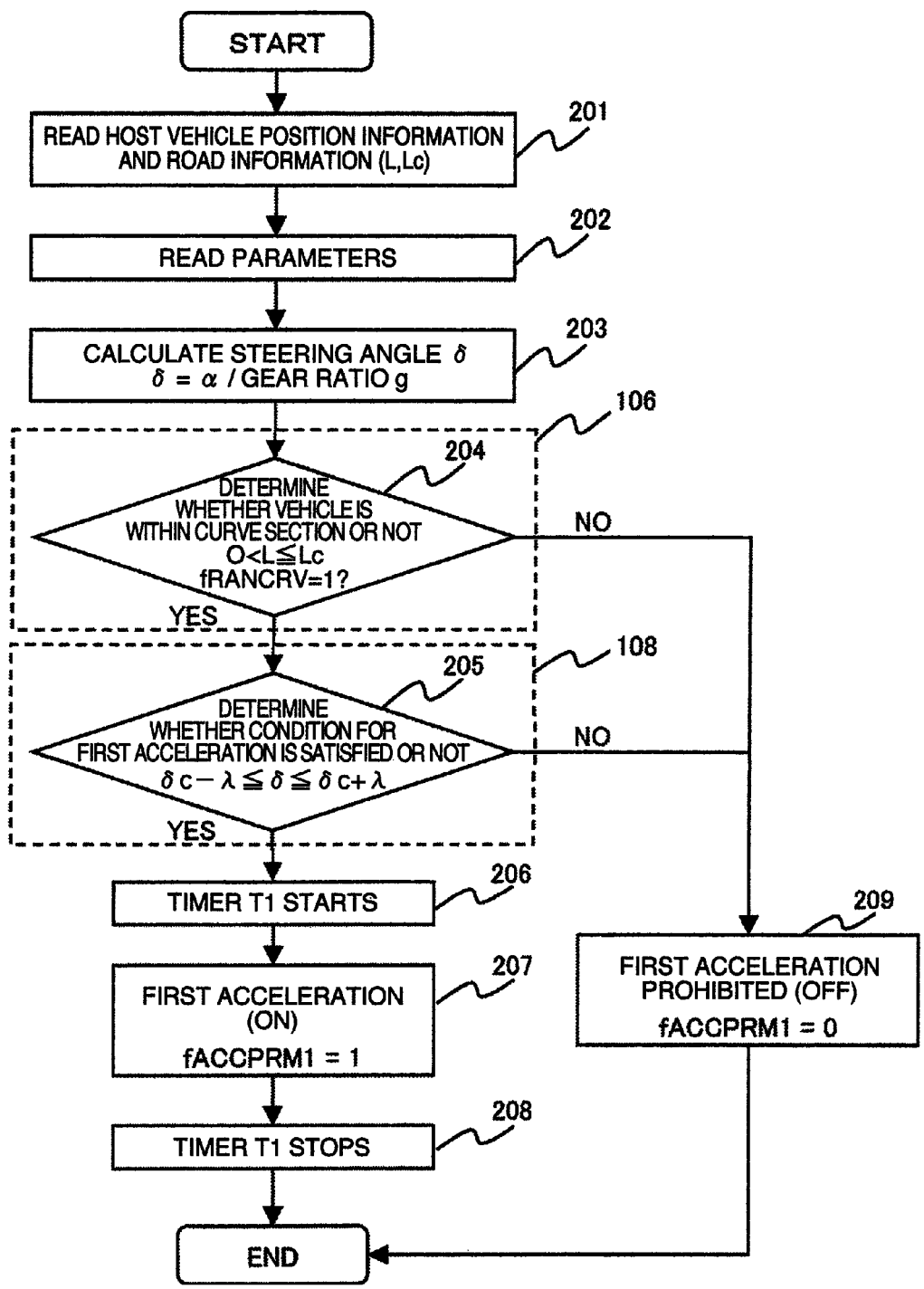
FIG. 2 is a flowchart of a first acceleration determining unit.

FIG. 2 is a flowchart of the first acceleration determining unit 108 when the first acceleration is started based on a road shape and the driver's steering rotation.

The first acceleration determining unit 108 reads the road shape and host-vehicle position information recognized by the road shape recognition unit 101 (step 201) and also reads parameters, such as the driver's steering rotation α and the host vehicle's speed VSP (step 202), and calculates a steering angle δ from a steering rotation α and a steering ratio g (gear ratio) by using Eq. (1) (step 203).

$$\delta = \alpha/g \quad (1)$$

Next, a comparison is made between a curve length Lc of a curve ahead of the host vehicle, read in step 201, and a distance L from the host vehicle till the exit of the curve by using Eq. (2), and a decision is made to determine whether or not the host vehicle is within a predetermined curve section (with the flag fRANCRV=1) (step 204).

$$0 < L \leq Lc \quad (2)$$

If the decision condition is established in step 204, since it is decided that the host vehicle is within the predetermined curve section, it is determined by using Eq. (3) whether or not the steering angle δ calculated in step 203 has converged in a predetermined range (δc±λ) (step 205).

$$\delta c - \lambda \leq \delta \leq \delta c + \lambda \quad (3)$$

If the decision condition is established in step 205, since it is determined that the driver's steering rotation has been completed in such a manner as to suit the shape of the road on which the host vehicle is running, a time-measuring timer T1 starts measuring time (step 206). When timer T1 has passed a predetermined time, the first acceleration of the host vehicle is permitted (with the first acceleration permit flag fACCPRM=1), by which the host vehicle starts the first acceleration (step 207). The timer T1 that has started measuring time in step 206 stops, at which the process in step 207 is stopped (step 208).

If the decision condition is not established in step 205, since it is determined that the driver's steering rotation has not been completed in such a manner as to suit the shape of the road on which the host vehicle is running, the host vehicle is prohibited from starting (with the first acceleration permit flag ACCPRM1=0) (step 209), by which the process is finished.

If the decision condition is not established in step 204, since it is determined that the host vehicle is not running in the predetermined curve section, the operation of step 209 is executed, and the process is finished.

As described above, by reading the road shape and the host-vehicle position information recognized by the road shape recognition unit 101, and also the driver's steering rotation detected by the parameter detecting unit 105, it is possible to determine whether or not to accelerate the host vehicle according to the driver's steering rotation. Note that instead of the steering rotation α, a yaw rate γ of the vehicle or a rate of lateral acceleration GL may be used for this purpose.

Figure 3:
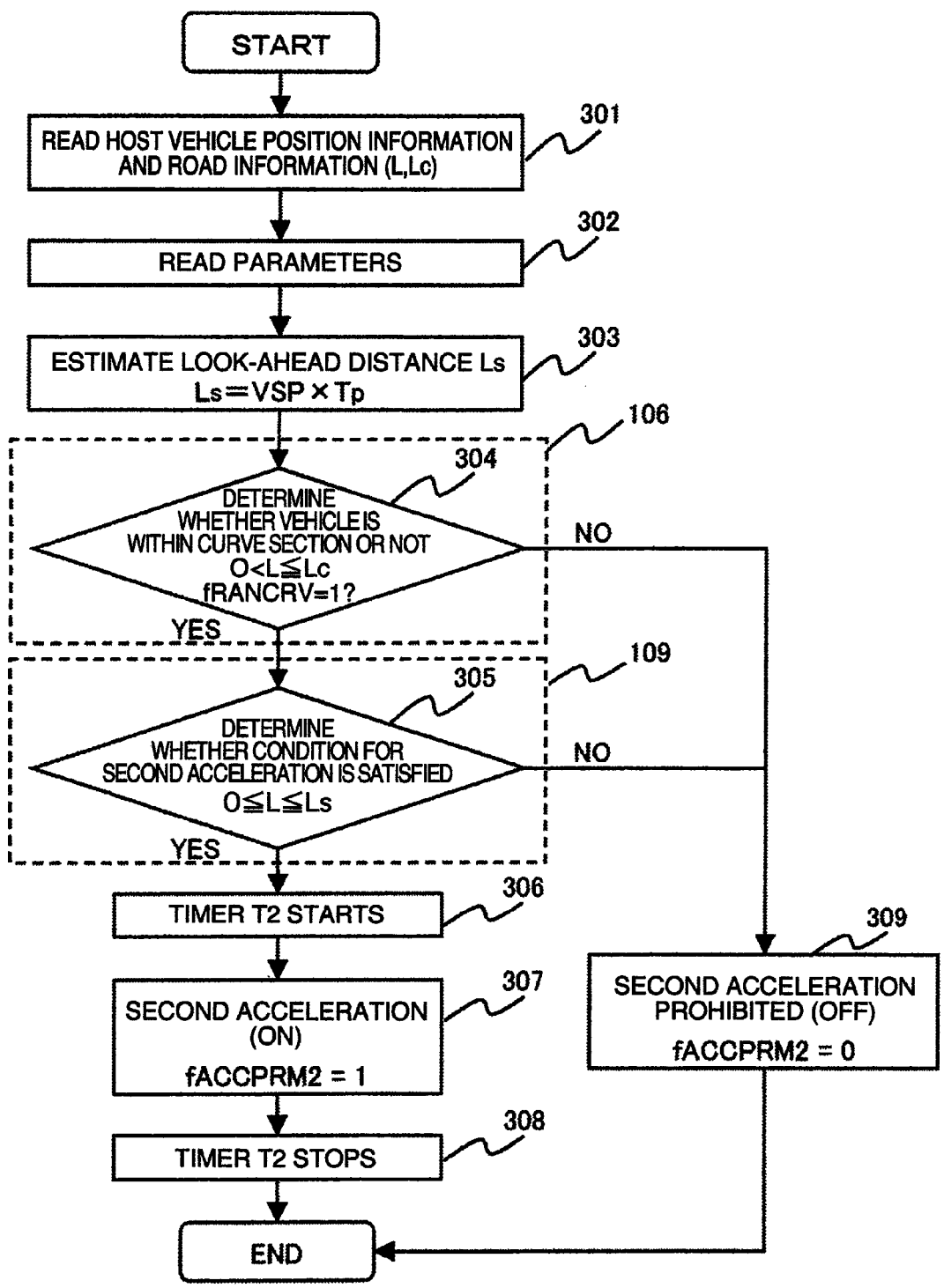
FIG. 3 is a flowchart of a second acceleration determining unit.

FIG. 3 is a flowchart of the second acceleration determining unit 109 when the second acceleration is started according to the road shape ahead of the host vehicle and foreseeing time.

The second acceleration determining unit 109 reads a road shape recognized by the road shape recognition unit 101 and host-vehicle position information (step 301), and also reads parameters, such as the driver's steering rotation a and a vehicle speed VSP (step 302), and the foreseeing time memory unit 102 estimates a look-ahead distance Ls by using Eq. (4). Here, Tp denotes a foreseeing time stored in the foreseeing time memory unit 102 or a foreseeing time corrected by the foreseeing time correcting unit 103, and VSP denotes the host vehicle's speed.

$$Ls = Tp \times VSP \quad (4)$$

By using Eq. (2), a comparison is made between the curve length Lc of a curve ahead of the host vehicle read in step 301 and the distance L, and a decision is made to determine whether or not the host vehicle is within a predetermined curve section—by checking if the running through curve flag fRANCRV=1 (step 304).

If the decision condition is established in step 304, since it is decided that the host vehicle is within the predetermined curve section, it is determined by using Eq. 5 whether or not the host vehicle has reached a point (look-ahead point) which is by the look-ahead distance Ls, estimated in step 303, backward from the exit point of the curve the host vehicle is running on (step 305).

$$0 < L \leq Ls \quad (5)$$

If the decision condition is established in step 305, since it is decided that that the host vehicle has reached a point (look-ahead point) which is by the look-ahead distance Ls backward from the exit point of the curve the host vehicle is running on, the time measuring timer T2 starts measuring time (step 306). Then, when the timer T2 has passed a predetermined time, the second acceleration of the host vehicle is permitted (with the second acceleration permit flag fACCPRM2=1), by which the host vehicle starts the second acceleration (step 307). The timer T2, which has started measuring time in step 306, stops, and the process is finished (step 308).

If the decision condition is not established in step 305, since it is determined that the host vehicle has not reached a point (look-ahead point), which is by the look-ahead distance Ls backward from the exit point of the curve that the host vehicle is passing through, the host vehicle is prohibited from accelerating (with the second acceleration permit flag fACCPRM2=0) (step 309), with which the process is finished.

If the decision condition is not established in step 304, since it is determined that the host vehicle is not in the predetermined curve section, the operation in step 309 is performed, with which the process is finished.

As has been described, by reading the road shape and host-vehicle position information recognized by the road shape recognition unit 101 and a look-ahead distance estimated by the look-ahead distance estimating unit 104 from a foreseeing time and the host vehicle's speed, it is possible to determine whether or not to accelerate the host vehicle according to the look-ahead distance.

Figure 4:
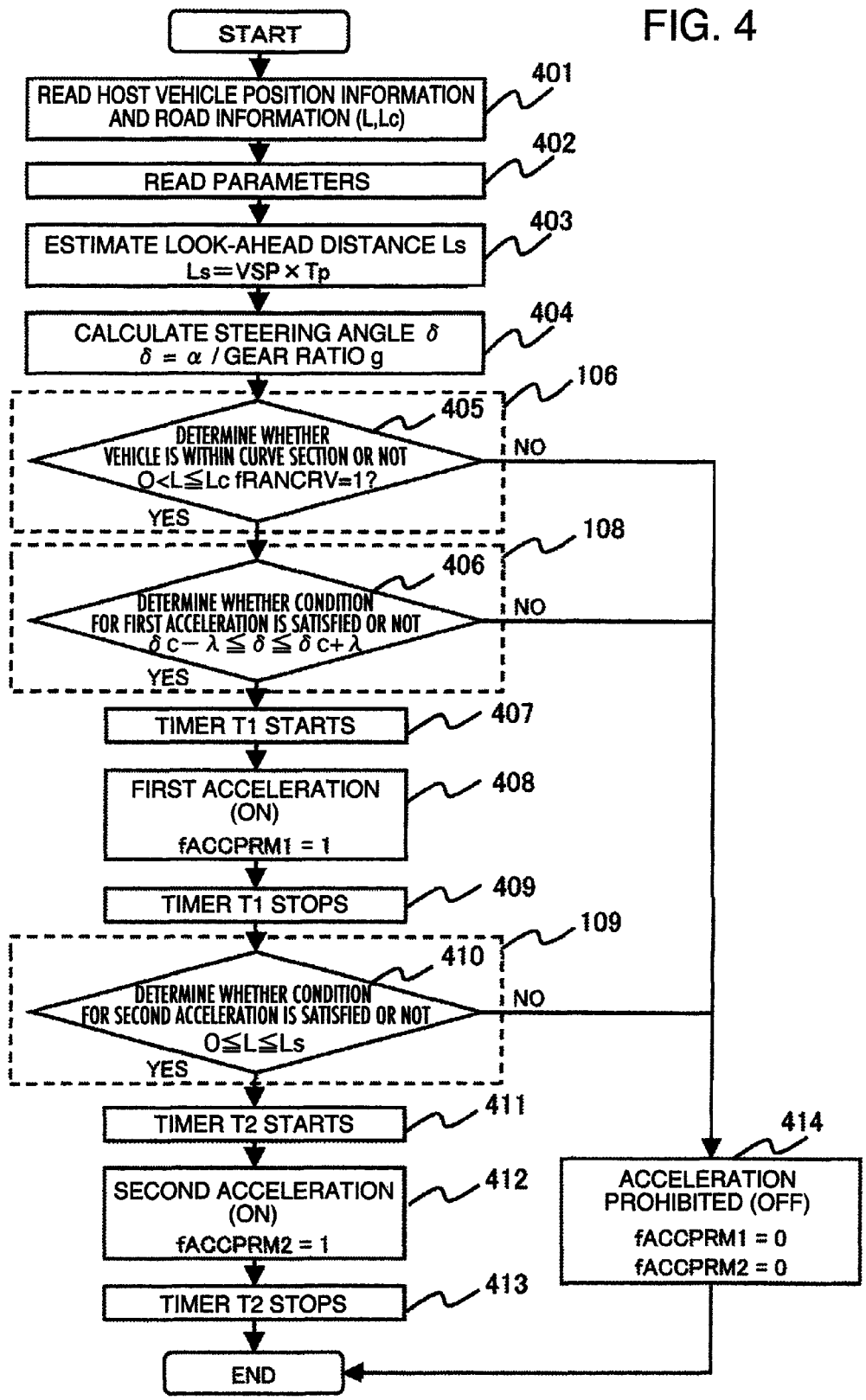
FIG. 4 is a flowchart of the acceleration determining unit.

FIG. 4 is a flowchart of the acceleration determining unit 107 when the first and the second are started acceleration according to the road shape ahead of the host vehicle, the driver's steering rotation, and foreseeing time.

The acceleration determining unit 107 reads the road shape and a vehicle position information recognized by the road shape recognition unit 101 (step 401), reads parameters, such as the driver's steering rotation a and a vehicle speed VSP, for example (step 402), the look-ahead distance estimating unit 104 estimates a look-ahead distance Ls by using Eq. (4) (step 403), the acceleration determining unit 107 calculates a steering angle δ from a steering rotation α and a steering ratio g (gear ratio) by using Eq. (1) (step 404), compares a curve length Lc of a curve ahead of the host vehicle read in step 401 and a distance L from the host vehicle and the exit of the curve by using Eq. (2), and determines whether or not the host vehicle is within the predetermined curve section—by checking the running through curve flag fRANCRV=1 (step 405).

If the decision condition is established in step 405, since it is determined that the host vehicle is within the predetermined curve section, a decision is made by using Eq. (3) whether the steering angle δ calculated in step 404 has converged in a predetermined range (δc±λ) or not (step 406).

If the decision condition is established in step 406, since it is determined that the driver's steering rotation has been completed in such a manner as to suit the shape of the road on which the host vehicle is running, the time-measuring timer T1 starts measuring time (step 407). Then, when the timer T1 has passed a predetermined time, the first acceleration of the host vehicle is permitted (with the first acceleration permit flag fACCRAN1=1), by which the first acceleration of the host vehicle (a partial acceleration) is started (step 408). The timer T1 that has started measuring time in step 407 stops (step 409).

Depending on the shape of the road ahead of the host vehicle, after the decision condition is established in step 405, it is possible to proceed to step 411 to cause the time-measuring timer T2 to start measuring time, and in step 412 when the timer T2 has passed a predetermined period of time, permit the host vehicle to perform the second acceleration (with the second acceleration permit flag fACCPRM2=1), with which the host vehicle starts the second acceleration (full acceleration).

Then, a decision is made by using Eq. (5) whether or not the host vehicle has reached a point (look-ahead point), which is by the look-ahead distance Ls, estimated in step 403, backward from the exit point of the curve the host vehicle is running on (step 410).

If the decision condition is established in step 410, since it is determined that the host vehicle has reached a point (look-ahead point), which is by the look-ahead distance Ls backward from the exit of the curve the host vehicles is running on, the time-measuring timer T2 starts measuring time (step 411). Then, after a predetermined time period passes, the host vehicle is permitted to execute the second acceleration (with the second acceleration permit flag fACCRAN2=1), by which the host vehicle starts the second acceleration (step 412). When the timer T2 that has started measuring time in step 411 stops (step 413), the process is finished.

If the decision condition is not established in step 410, since it is determined that the host vehicle has not reached a point (look-ahead point), which is by the look-ahead distance Ls backward from the exit of the curve the host vehicle is running on, the host vehicle is prohibited from accelerating (with the second acceleration permit flag fACCRAN2=0) (step 414), and the process is finished.

If the decision condition is not established in step 405 or 406, since it is determined that the host vehicle is not in the predetermined curve section or that the driver's steering rotation has not been completed in such a manner as to suit the shape of the road that the host vehicle is running on, the operation in step 414 is executed and the process is finished.

As described above, by reading the road shape and host-vehicle position information recognized by the road shape recognition unit 101, the driver's steering rotation detected by the parameter detecting unit 105, and the look-ahead distance estimated from the foreseeing time and the host vehicle's speed by the look-ahead distance estimating unit 104, a decision can be made whether or not to accelerate the host vehicle by the first acceleration according to the driver's steering rotation and whether or not to accelerate the host vehicle by the second acceleration according to the look-ahead distance.

FIG. 5 is a flowchart of the look-ahead distance estimating unit 104 when a look-ahead distance Ls is estimated according to the host vehicle's speed and a foreseeing time Tp of the driver.

The look-ahead distance estimating unit 104 reads parameters, such as the driver's steering rotation α, a host vehicle's speed VSP, and the driver's accelerator operation (step 501), sets at least one of foreseeing times Tp stored in the foreseeing time memory unit 102 (step 502), and by selecting at least one of the parameters read in step 501, corrects the foreseeing time Tp selected in step 502 according to a selected parameter and a road shape recognized by the road shape recognition unit 101 (step 503).

The look-ahead distance estimating unit 104 reads the foreseeing time Tp corrected in step 503 (step 504). Incidentally, the foreseeing time Tp read in step 504 may be a foreseeing time set in step 502. By using the host vehicle's speed VSP read in step 501 and the foreseeing time Tp read in step 504 and also using Eq. (4), a look-ahead distance Ls is estimated (step 505), with which the process is finished.

FIG. 6 is a chart showing an example of a method for selecting a foreseeing time Tp [sec] stored in the foreseeing time memory unit 102.

One of common storage media used to store foreseeing time is a random access memory (RAM). Foreseeing times are previously stored in a range of 1.0 to 2.0 [sec]. Meanwhile, regarding foreseeing times Tp to be stored, foreseeing times may be values outside of the range of 1.0 to 2.0 [sec].

Among the methods for storing foreseeing times Tp, there are a method for storing foreseeing times Tp at regular intervals in a predetermined range (stored, for example, at intervals of 0.1 [sec] in a range of 1.0 to 2.0 [sec]), and another method for storing foreseeing times Tp in a table form arranged according to types of road information (curve length L[m], curvature radius R[m], and road surface friction coefficient μ, for example), and also according to running conditions (vehicle speed, yaw rate, lateral acceleration rate). Note that instead of storing foreseeing times previously, foreseeing times Tp may be calculated based on a road shape and a running condition of the host vehicle recognized by the road shape recognition unit 101 to update the foreseeing times Tp in the foreseeing time memory unit 102.

A foreseeing time is selected either manually by the driver, or automatically according to the road shape and the running condition of the host vehicle running through a curve. For example, as methods for selecting foreseeing time Tp by the driver, there is a method of selecting at least one of foreseeing times Tp which are stored at a rate of one each for a predetermined range as shown in FIG. 6, and another method for setting foreseeing times Tp by previously setting driving patterns according to the road shape, setting a foreseeing time Tp for each driving pattern, and selecting at least one driving pattern according to the shape of the road that the host vehicle is running on and also according to the running condition. When the driver actually selects a foreseeing time, a foreseeing time selection image is shown on the display screen on the on-board terminal device, and the driver selects at least one foreseeing time Tp. Otherwise, a button or a dial configured to select a foreseeing time Tp may be provided on the instrument panel, and the driver may select a foreseeing time Tp [sec].

FIG. 6 shows a case a foreseeing time Tp is selected automatically according to a road shape recognized by the road shape recognition unit 101 and a running condition of the host vehicle detected by the parameter detecting unit 105, and illustrates an example of method of selecting a foreseeing time according to a curve length L[m] and the host vehicle's speed VSP[km/h] in this table, for example.

When a foreseeing time Tp[sec] is set according to a curve length L[m] ($0<Li<Lj<Lk<Lm$) of the road the host vehicle is running on and the host vehicle speed VSP[km/h] ($0<Va<Vc<Ve<Vg$) and when the curve length L[m] of the road the host vehicle is running on and the host vehicle speed VSP[km/h] are recognized, a relevant foreseeing time Tp is selected automatically from the table. Or, a foreseeing time Tp may be calculated according to the curve length L[m] of the road the host vehicle is running on and the host vehicle speed VSP[km/h], and a calculated foreseeing time Tp may be selected. Besides the curve length and the host vehicle's speed, other parameters, such as a yaw rate, a rate of lateral acceleration and either acceleration or deceleration may be used.

As described above, a foreseeing time Tp can be selected according to a road shape and host vehicle's speed recognized by the road shape recognition unit 101.

FIG. 7 is a diagram showing a case where before entering a curve, the host vehicle starts to decelerate and stops decelerating a the entrance of a curve, and then accelerates according to the road shape, which is recognized by the road shape recognition unit 101 while passing through the curve, the driver's steering rotation detected by the parameter detecting unit 105, and the look-ahead distance estimated by the look-ahead distance estimating unit 104 (when the host vehicle drives through a curve and into a straight way).

FIG. 7A shows the curvature radius R[m] (solid line 702) of the road shape that changes with the position of the running vehicle.

FIG. 7B shows changes (solid line 704) in the driver's steering rotation (steering angle δ) according to the road shape while the vehicle is running.

FIG. 7C shows how acceleration is notified to the driver (706, 707, 708) when the vehicle accelerates according to the driver's steering rotation (steering angle δ) and a look-ahead distance Ls estimated by the look-ahead distance estimating unit 104.

FIG. 7D shows changes in the vehicle speed when the vehicle comes out of a straight path and enters a curve, comes out of the curve, and goes on to a straight road again. The dashed line 710 shows changes in vehicle speed during deceleration before entering the curve, the solid line 711 indicates changes in vehicle speed when the vehicle runs through the curve at a constant speed, the solid line 712 shows changes in speed when the vehicle performs the first acceleration according to the road shape and the steering angle δ, and the solid line 713 shows changes in speed when the vehicle performs the second acceleration according to the road shape and the look-ahead distance, and the dotted line illustrates changes in speed after coming out of the curve.

The speed control unit 111 calculates a target speed according to a curvature radius R (solid line 702) of the road ahead of the host vehicle, recognized by the road shape recognition unit 101, and the vehicle decelerates in such a manner that the deceleration ends at the predetermined curve entrance A (dashed line 710). After the end of deceleration, after the vehicle enters the predetermined curve AB, as illustrated by the solid line 704, the vehicle runs at a constant speed of Vmin until the driver's steering rotation (steering angle δ) converges in a predetermined range (δc±λ) (solid line 711).

At the end point P of the steering operation in FIG. 7C, after the driver's steering rotation (solid line 704) converges in the predetermined range, when a predetermined time T1 passes, the first acceleration determining unit 108 issues a permission to accelerate. When the first acceleration is permitted, the speed control unit 111 calculates a target speed according to the road shape recognized by the road shape recognition unit 101 and also according to the first acceleration, the acceleration notification unit 110 notifies the driver that the first acceleration will start (acceleration notification 706), with which the vehicle starts the first acceleration (solid line 712).

After the vehicle has started the first acceleration, the second acceleration determining unit 109 determines whether or not to perform the second acceleration according to the predetermined curve exit B, recognized by the Ls estimated by the look-ahead distance estimating unit 104. After a lapse of a predetermined time T2 following the arrival of the host vehicle at a point (look-ahead point Q), which is by the look-ahead distance Ls backward from the predetermined curve exit B ahead of the vehicle, the second acceleration determining unit 109 permits the host vehicle to perform the second acceleration. When the second acceleration is permitted, the speed control unit calculates a target speed according to the road shape recognized by the road shape recognition unit 101 and also according to the second acceleration, the acceleration notification unit 110 notifies the driver that the second acceleration will start (acceleration notification 707), with which the vehicle starts the second acceleration (solid line 713).

After the host vehicle has started the second acceleration, when the vehicle is passing the predetermined curve exit B, the acceleration notification unit 110 notifies the driver that the vehicle is getting out of the predetermined curve (acceleration notification 708), and even after the vehicle has come out of the predetermined curve AB, the vehicle continues the second acceleration until the target speed calculated by the speed control unit 111 (solid line 714) is reached. After the first acceleration and the second acceleration have started, if the driver accelerates the host vehicle by depressing the accelerator pedal, this acceleration by the driver's accelerator operation takes priority.

In a case where the first acceleration is performed according to the driver's steering rotation, besides performing the first acceleration determination according to a steering rotation, it is possible to determine whether or not to accelerate the host vehicle by using a yaw rate γ of the vehicle calculated by Eq. (6) based on cornering performance, or by using a rate of lateral acceleration GL of the vehicle calculated by Eq. (7) for the lateral motion of the vehicle. Meanwhile, for the yaw rate γ of the vehicle, a value detected by a yaw rate sensor may be used.

$$\gamma = \frac{1}{1 - \frac{m}{2l^2} \cdot \frac{l_f K_f - l_r K_r}{K_f K_r} VSP^2} \cdot \frac{VSP}{l} \delta \qquad (6)$$

$$m \cdot G_L = m \cdot VSP^2 / R \qquad (7)$$

where $K_f$ and $K_r$ are the front wheel cornering power and the rear wheel cornering power, m is a vehicle weight, $l_f$ and $l_r$ are distances from the vehicle's center of gravity to the front axle and the rear axle ($l=l_f+l_r$), and VSP is a vehicle speed.

The recognition of the road shape by the road shape recognition unit 101 is performed on the on-board terminal device. As the on-board terminal device, a car navigation system or a camera is used. For example, when the predetermined curve exit B is recognized early from map information loaded in the car navigation system, but if there is an error in the distance from the host vehicle position up to the predetermined curve exit B, by recognition of the predetermined curve exit B through a camera, the error in the distance between the host vehicle position and the predetermined curve exit B is corrected. This enables the vehicle to accelerate without sacrificing the driving comfort when the vehicle is getting out of the predetermined curve.

As described above, when a vehicle drives through a curve or gets out of the curve, by controlling the acceleration of the vehicle according to a road shape recognized by the road shape recognition unit 101, the driver's steering rotation detected by the parameter detecting unit 105, and a look-ahead distance estimated by the look-ahead distance estimating unit 104, the vehicle can be accelerated with improved driving comfort for the driver.

Figure 8:
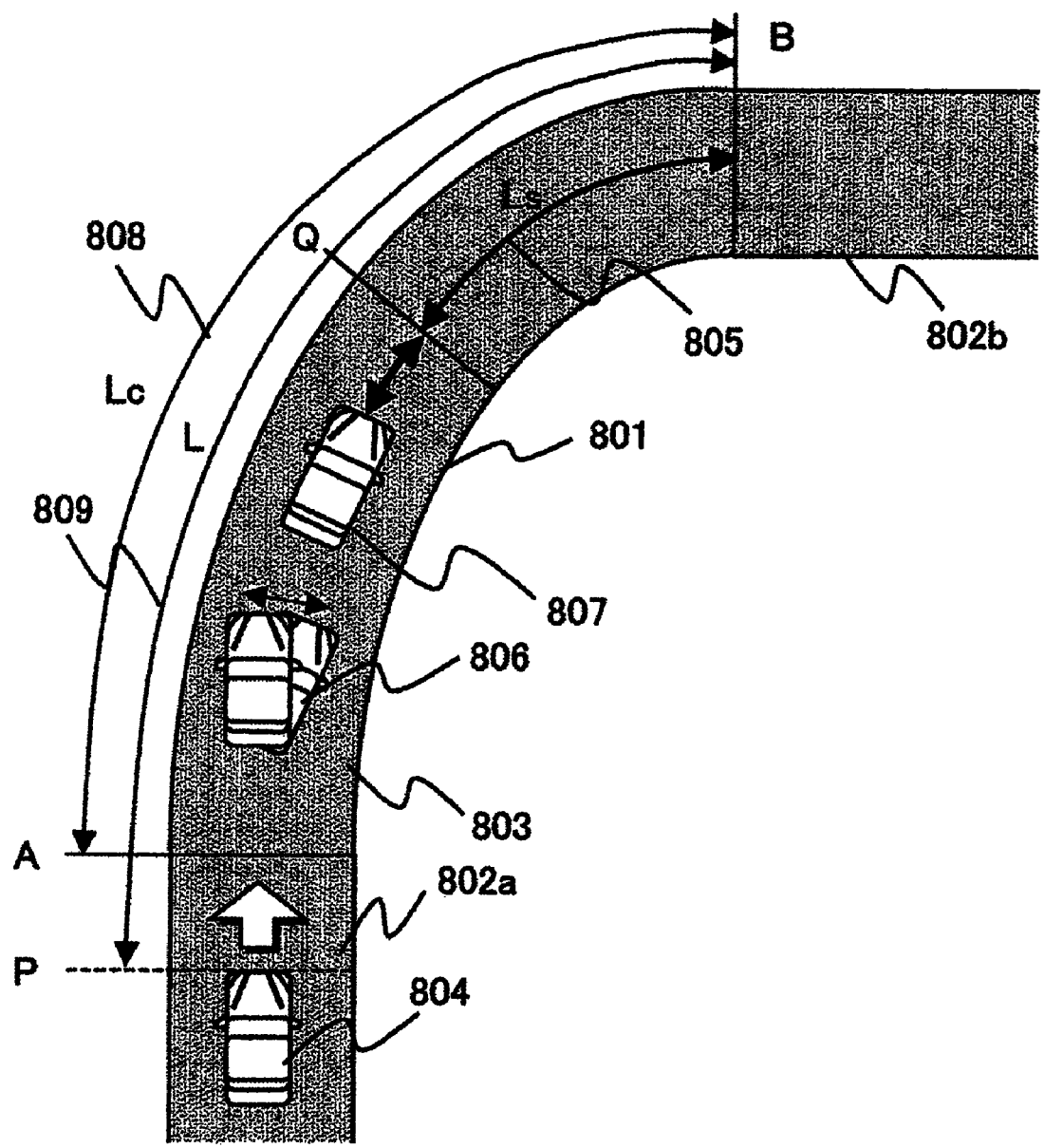
FIG. 8 is a diagram showing an example of a case where acceleration of the host vehicle is prohibited.

FIG. 8 is a schematic diagram illustrating an example of a case where the host vehicle is prohibited from accelerating in the acceleration determining unit 107 which determines whether or not to accelerate the vehicle according to a road shape recognized by the road shape determining unit 101, the driver's steering rotation detected by the parameter detecting unit 105, and a look-ahead distance estimated by the look-ahead distance estimating unit 104.

A vehicle 804 is running on a road 801 consisting of straight sections 802a, 802b, and a curve 803. A distance 809 from a position P of the host vehicle up to the exit B of the curve is designated as L, a curve length 808 of a curve 803 as Lc, and a look-ahead distance 805 of the vehicle 804 as Ls. While the vehicle 804 is running on the straight section 802a, the road shape recognition unit 101 recognizes a curve 803 ahead of the host vehicle and as the deceleration ends at the entrance of the curve 803, the vehicle enters the curve 803. While the vehicle 804 is running along the curve 803, the vehicle speed is controlled based on a acceleration determination performed according to the driver's steering rotation, and a look-ahead distance 805 calculated from a foreseeing time and the host vehicle's speed. Under this situation, the vehicle 804 comes out of the curve 804 and goes on a straight road 802b.

A case where the vehicle 804 is not accelerated will be described. For example, when the vehicle 804 does not enter the curve 803 and is running on the straight road 802a, the relation between the distance 809 from the position P of the host vehicle up to the exit B of the curve, and a curve length 808 of the curve 803 will be Lc<L, which does not satisfy the acceleration decision condition (0<L≦Lc) of the curve section determining unit 106. Therefore, the vehicle 804 is not accelerated.

When the vehicle 804 has entered the curve 803, under a condition 806 that the driver's steering rotation is not completed in such a manner as to suit the shape of the road on which the vehicle 804 is running, and that the driver's steering angle δ has not converged in a predetermined range (δc±λ), since the acceleration determining condition (δc−λ≦δ≦δc+λ) of the first acceleration determining unit 108 is not satisfied, the vehicle 804 is not accelerated.

Again, when the vehicle 804 has entered the curve 803, under a condition 807 that the vehicle 804 has not reached a point Q (look-ahead point), which is by the look-ahead distance 805 backward from the exit B of the curve (Ls<L), since the acceleration determining condition (0≦L≦Ls) of the second acceleration determining unit 109 is not satisfied, the vehicle 804 is not accelerated.

The case where the vehicle 804 is not accelerated may be as follows: when the driver has operated the accelerator pedal and the brake pedal, when there is a preceding vehicle ahead of the vehicle 803, when speed control by inter-vehicular distance control, such as ACC, takes priority, when the curve length 808 of the curve 803 is shorter than the look-ahead distance 805, when the on-board terminal device recognizes a sign of "Under Construction", for example in the curve 803 ahead of the vehicle 804, when the visibility ahead of the vehicle 804 is poor due to buildings in the vicinity of the curve 803, or when the forward visibility from the vehicle 804 is poor or the surface condition of the road 801 is poor due to a bad weather (rain, fog, snow, for example). The acceleration notification unit 110 may notify the driver that the vehicle 804 is not accelerated on the display screen of the on-board terminal device, or by a sound or an alarm.

As described above, if a distance L from the host vehicle position till the exit of the curve, a curve length Lc of a curve section, a steering rotation of the host vehicle (steering angle δ), or a look-ahead distance based on the host vehicle's speed VSP or a foreseeing time Tp does not satisfy a related acceleration determining condition, the host vehicle is prohibited from accelerating, thus improving the safety of the host vehicle and the driving comfort to the driver along a curve and on a road in the vicinity of the curve.

Figure 9:
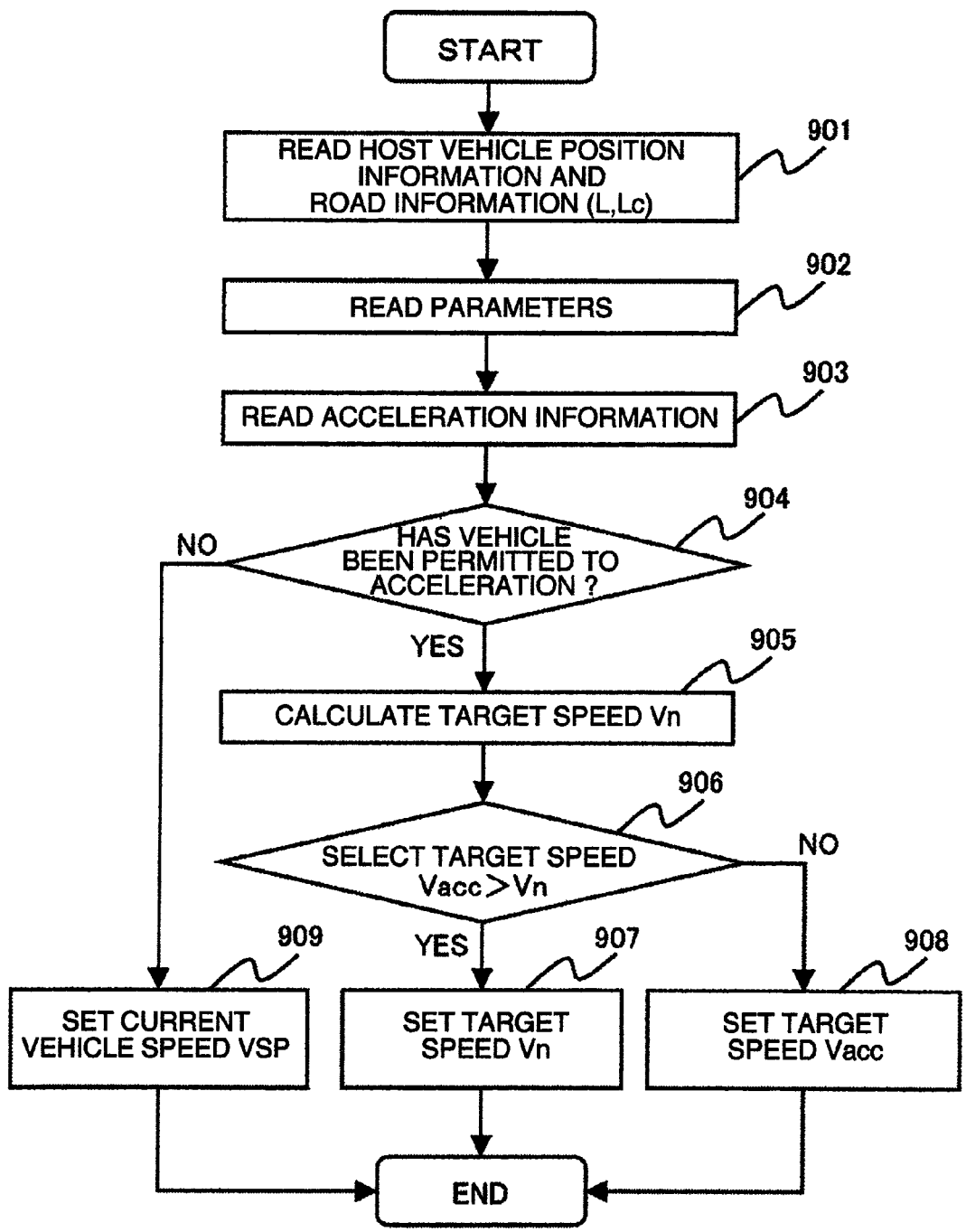
FIG. 9 is a flowchart showing a target speed setting process in the speed control unit.

FIG. 9 is a flowchart for setting a target speed in the speed control unit 111 when the host vehicle is running along a curve or coming out of a curve.

The speed control unit 111 reads a road shape and a host vehicle position information recognized by the road shape recognition unit 101 (step 901), reads parameters, such as the driver's steering angle α, a vehicle speed VSP, ACC target speed Vacc (step 902), and reads an acceleration determination result by the acceleration determining unit 107 and a predetermined acceleration rate based on ACC (step 903).

Based on an acceleration determination result read in step 903, a decision is made whether or not the host vehicle has been permitted to accelerate (step 904). If it is determined that the vehicle has been permitted to accelerate, a target speed Vn is calculated according to parameters read in step 902 and the road shape ahead of the host vehicle recognized by the road shape recognition unit 101 (step 905).

A comparison is made between an ACC target speed Vacc read in step 902 and a target speed Vn of the host vehicle calculated in step 905 by using Eq. (8), by which a target speed is selected for the host vehicle (step 906).

$$Vacc > Vn \qquad (8)$$

If the decision condition is established in step 906, since it is determined that the target speed Vn calculated in step 905 is lower than the ACC target speed Vacc, the target speed Vn calculated in step 905 is set as the target speed for the host vehicle (step 907), with which the process is finished.

If the decision condition is not established in step 906, since it is determined that the target speed Vn calculated in step 905 is higher than the ACC target speed Vacc, the ACC target speed Vacc read in step 902 is set as the target speed for the host vehicle (step 908), with which the process is finished.

If the host vehicle has not been permitted to accelerate in step 904, the current vehicle speed VSP of the host vehicle is set as the target speed for the host vehicle (step 909), with which the process is finished (acceleration is prohibited, running at constant speed).

Figure 10:
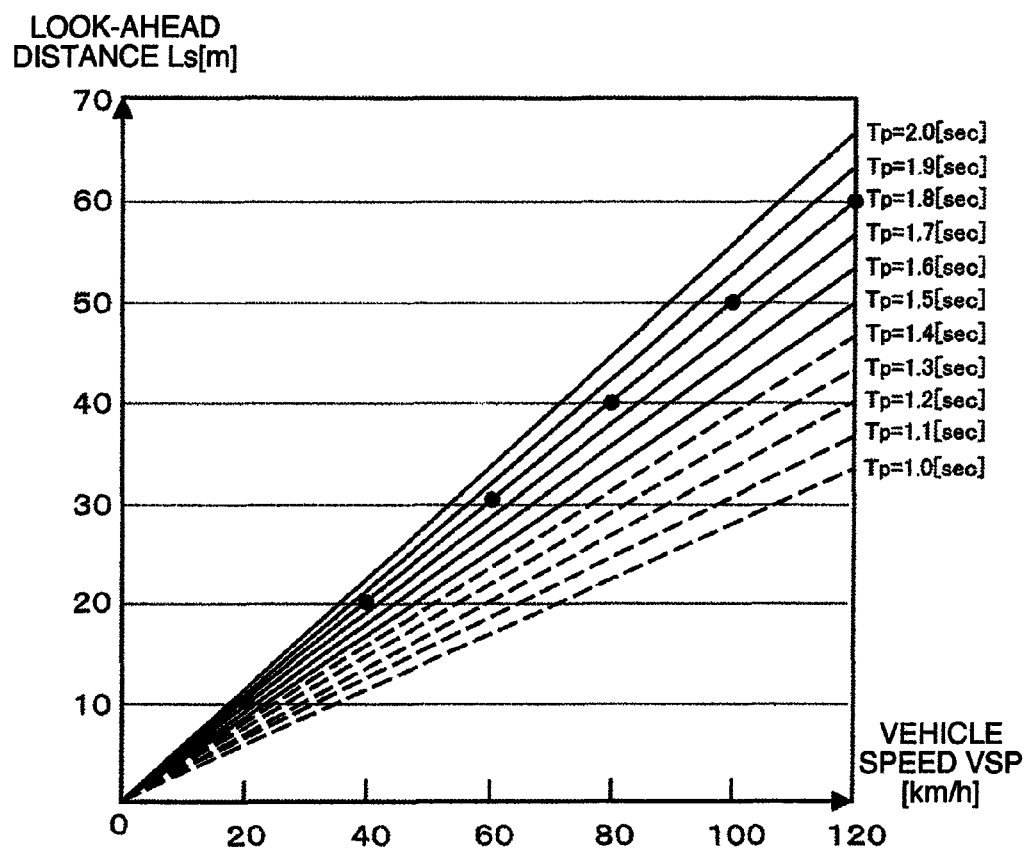
FIG. 10 is a diagram showing a relation between the look-ahead distance and the host vehicle's speed.

FIG. 10 is a diagram showing a relation between the look-ahead distance Ls and the host vehicle's speed. The vertical axis indicates the look-ahead distance Ls and the horizontal axis indicates the vehicle speed VSP, and the gradients of the respective straight lines indicate foreseeing times Tp.

A look-ahead distance Ls, which is used when the second acceleration determining unit 109 determines whether to accelerate the host vehicle at the second acceleration, is stored in the foreseeing time memory unit 102. The look-ahead distance Ls can be determined according to a foreseeing time Tp corrected by the foreseeing time correcting unit 103 and a vehicle speed VSP. For example, when a foreseeing time is 1.8 [sec] (gradient of a straight line), if the vehicle speed VSP is 20 [km/h], the look-ahead distance is about 10 m, or if the vehicle speed VSP is 40 [km/h], the look-ahead distance is about 20 m, or if the vehicle speed is 60 [km/h], the look-ahead distance is about 30 m. So, there is a proportional relation between the look-ahead distance Ls and the vehicle speed VSP as illustrated in FIG. 10.

Therefore, by setting at least one foreseeing time Tp to suit the road shape and the driver, both a look-ahead distance Ls according to the host vehicle's speed VSP and a start point of the second acceleration associated with the look-ahead distance Ls can be determined uniquely.

The foreseeing time TP may be estimated according to the road shape recognized by the road shape recognition unit 101 and the vehicle speed VSP. For example, when the host vehicle is running at a speed of 60 [km/h], if the exit of the curve located at a point 30 m ahead of the host vehicle or a change point of the radius of curvature is recognized by the driver or by the car navigation system or a camera, since the look-ahead distance Ls is 30 m, a foreseeing time Tp can be determined uniquely as 1.8 [sec].

The look-ahead distance Ls may be estimated according to a result of recognition of a change point of the radius of curvature by the car navigation system or the camera in addition to by the look-ahead distance by the driver's foreseeing time.

Owing to the relation between the look-ahead distance Ls and the vehicle speed VSP shown in FIG. 10, the upper-limit number of foreseeing times to be stored in the foreseeing time memory unit 102 can be determined from a road shape and the host vehicle's speed VSP recognized by the road shape recognition unit 101. For example, when the host vehicle is running at a speed of 40 [km/h] along a short curve which is 20 m in curve length, the foreseeing time Tp is in a range of 0 [sec] to 1.8 [sec]. The upper limit of foreseeing time that can be selected from the graph is 1.7 [sec]; therefore, the safety in accelerating the vehicle according to a foreseeing time can be ensured.

As described above, a start point of the second acceleration according to the look-ahead distance used for the acceleration determining unit 107 to determine whether or not to perform the second acceleration can be determined according to a foreseeing time Tp and the host vehicle's speed VSP.

Figure 11:
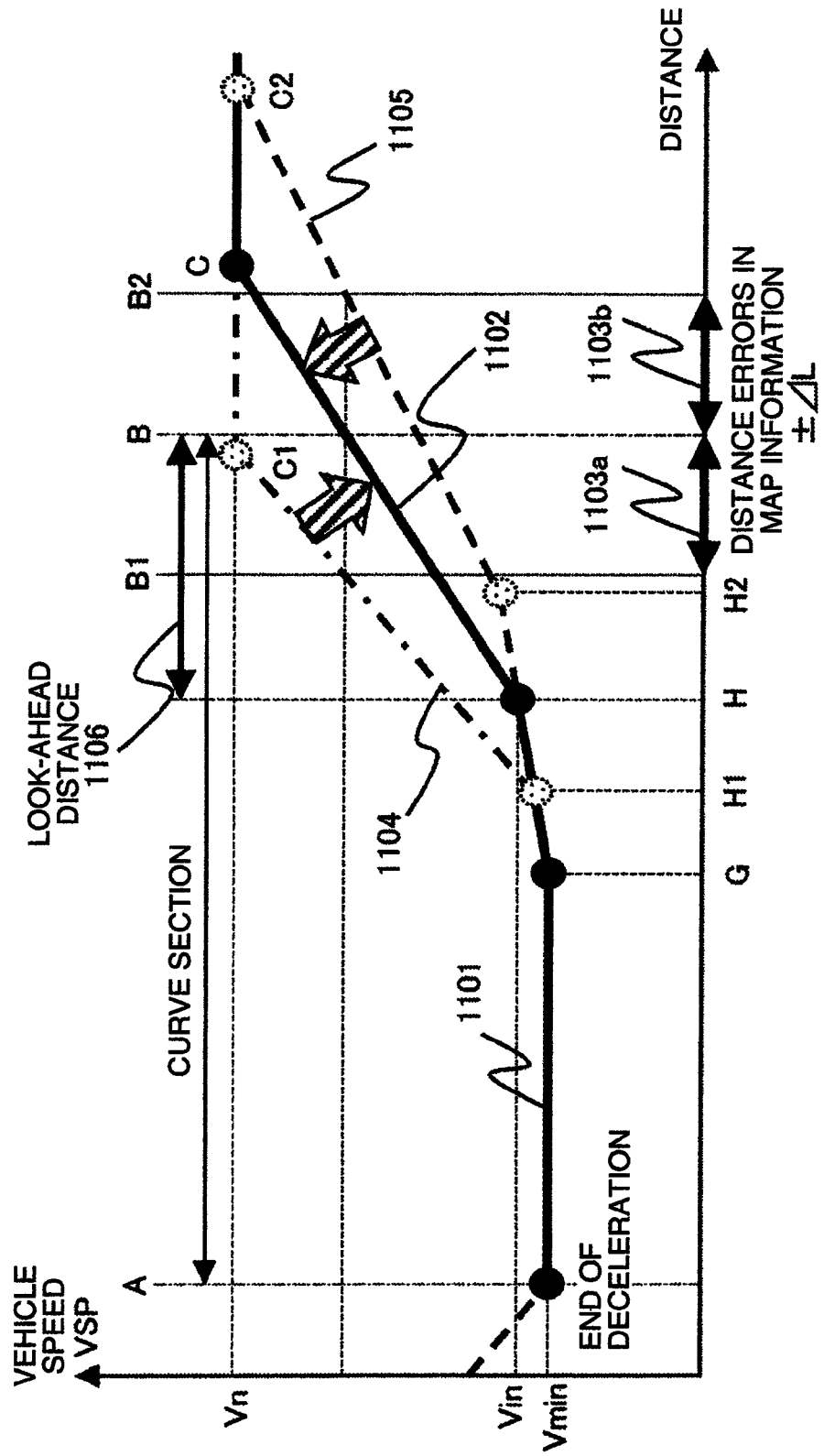
FIG. 11 is a diagram showing distance error correction in map information using the look-ahead distance.

FIG. 11 is a diagram of a case where the vehicle speed is controlled as illustrated. In the first road shape recognition unit 112 that recognizes a road shape with reference to map information, if there are errors in a distance from the host vehicle's position to a predetermined curve exit relative to a distance from the host vehicle's position to an actual curve exit, the distance from the host vehicle's position to the predetermined curve exit is corrected by using a road shape recognized by the second road shape recognition unit 113 that recognizes a road shape based on information other than map, and a look-ahead distance estimated by the look-ahead distance estimating unit 104, and the vehicle speed is controlled based on the curve exit point after the correction.

A curve line from a solid line 1101 to a solid line 1102 shows the changes in the vehicle speed VSP. More specifically, the vehicle finishes deceleration at a specified curve entrance, runs at constant speed of Vmin, and starts the first acceleration at point G according to a steering rotation detected by the parameter detecting unit 105. After the first acceleration is started, the vehicle starts the second acceleration at point H according to a road shape recognized by the road shape recognition unit 101 and a look-ahead distance 1106 estimated by the look-ahead distance estimating unit 104, the vehicle speed VSP reaches a target speed Vn at point C, after which the vehicle speed VSP stays at constant speed Vn.

A curve line from the solid line 1101 to a dashed line 1104 shows the changes of the host vehicle's speed. After the vehicle finishes decelerating at a predetermined curve entrance A, the vehicle runs at a constant speed of Vmin, and at point G, and starts the first acceleration according to the deriver's steering rotation detected by the parameter detecting unit 105. Owing to a distance error 1103a in the distance between the host vehicle position recognized by the first road shape recognizing unit 112 and the predetermined curve exit B, the predetermined curve exit recognized by the road shape recognizing unit 112 is taken as B1 and therefore the second acceleration is started at point H1 according to the look-ahead distance estimated by the look-ahead distance estimating unit 104, and therefore the vehicle speed will reach the target speed Vn at point C1.

A curve from the solid line 1101 to the dashed line 1105 shows the changes in the vehicle speed CSP. After the vehicle finishes decelerating at the predetermined curve entrance A, the vehicle runs at constant speed of Vmin, and starts the first acceleration at point G according to the driver's steering rotation detected by the parameter detecting unit 105. Owing to a distance error 1103b in the distance between the host vehicle position recognized by the first road shape recognizing unit 112 and the predetermined curve exit B, the predetermined curve exit recognized by the first road shape recognizing unit 112 is taken as B2, and therefore the second acceleration is started at point H2 according to the look-ahead distance estimated by the look-ahead distance estimating unit 104, and therefore the vehicle speed will reach the target speed Vn at point C2.

If a distance error 1103a or 1103b is included in the position information about the predetermined curve exit B recognized by the first road shape recognizing unit 112 based on car-navigation map information, the predetermined curve exit based on the map information will be B1 or B2, and therefore the host vehicle's speed VSP is controlled as depicted by a line 1104 or 1105. Thus, the second road shape recognizing unit 113 recognizes a point where the radius of curvature ahead of the vehicle changes by a camera mounted on the vehicle (hereafter referred to as curvature change point), and estimates the predetermined curve exit B by utilizing the curvature change point recognized by the camera. The foreseeing time correcting unit 103 corrects a foreseeing time according to the distance between the host vehicle position and the predetermined exit B, and the look-ahead distance estimating unit 104 estimates a look-ahead distance 1106 by using a corrected foreseeing time. By correcting the distance between the host vehicle's position and the predetermined curve exit B1 or B2, which includes the distance error 1103a or 1103b by using position information, such as the estimated look-ahead distance 1106 and the predetermined curve exit B estimated by the second road shape recognizing unit 113, the predetermined curve exit in map information can be set at B, and the acceleration of the vehicle can be controlled (as shown by the solid line 1102) according to the predetermined curve exit B after the correction described above.

The information other than map here refers to road information (white and yellow lines, guardrails, road sidewalls, other vehicles, signs, etc.) detected by using a radar (laser, millimeter waves, infrared rays, microwaves, etc.) as well as image information through the camera mounted on the vehicle. If a predetermined curve exit B ahead of the vehicle can be recognized directly by the camera, a foreseeing time may be corrected according to the directly-recognized predetermined curve exit B.

The picture-taking direction of the camera mounted on the vehicle may be in any direction other than in the front direction, such as in the lateral, backward or diagonal direction, namely, in all directions of the vehicle. With regard to the type of camera, the camera may be a single-lens camera that takes pictures with one camera, or a stereo camera that takes pictures with two cameras. With regard to the number of cameras to be mounted, a camera may be mounted in each of the left, right, front, and rear directions of the vehicle.

As has been described, by correcting errors in distances in map information by using the look-ahead distance and controlling the speed of the vehicle with appropriate timing, the safety and the comfort of the driver can be improved during acceleration when the vehicle is running along and coming out of curves.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle speed control system, comprising:
   a road shape recognition unit which recognizes a road shape;
   a target speed setting unit which sets a target speed of a host vehicle according to the road shape;
   a speed control unit which controls a speed of the host vehicle according to the target speed;
   a parameter detecting unit which detects at least one of parameters representing the driver's steering rotation, a yaw rate of the host vehicle, and a lateral acceleration rate of the host vehicle; and
   a first acceleration determining unit which, after the speed control unit has decelerated the host vehicle, determines whether or not to accelerate the host vehicle according to reference parameters based on the road shape and the speed of the host vehicle and parameters detected by the parameter detecting unit, wherein, when the first acceleration determining unit has determined to accelerate the host vehicle, the target speed setting unit sets a target speed of the host vehicle according to a predetermined acceleration.

2. The vehicle speed control system according to claim 1, wherein the first acceleration determining unit determines whether or not to accelerate the host vehicle under the condition that deviations between the reference parameters and the parameters detected by the parameter detecting unit converge in predetermined ranges.

3. The vehicle speed control system according to claim 2, wherein the first acceleration determining unit determines whether or not to accelerate the host vehicle after the condition that deviations between the reference parameters and the parameters detected by the parameter detecting unit converge in predetermined ranges has continued for more than a predetermined period of time.

4. The vehicle speed control system according to claim 1, further comprising an acceleration notification unit which notifies the driver that the host vehicle should accelerate by using at least one of a display screen, by a sound or an alarm on an on-board terminal device when the first determining unit or the second determining unit has determined to accelerate the host vehicle.

5. A vehicle speed control system, comprising:
a road shape recognition unit which recognizes a road shape;
a target speed setting unit which sets a target speed of a host vehicle according to the road shape; and
a second acceleration determining unit which, after the speed control unit has decelerated the host vehicle, estimates a look-ahead distance according to the speed of the host vehicle and a foreseeing time, and determines whether or not to accelerate the host vehicle according to the road shape ahead of the host vehicle and the look-ahead distance,
wherein, when the second acceleration determining unit has determined to accelerate the host vehicle, the target speed setting unit sets a target speed for the host vehicle according to a predetermined acceleration rate.

6. The vehicle speed control system according to claim 5, wherein the second acceleration determining unit calculates a distance from a point where the host vehicle is running till a point where the road shape ahead of the host vehicle coincides with a predetermined shape, and determines whether or not to accelerate the host vehicle under the condition that a calculated distance is within the look-ahead distance.

7. The vehicle speed control system according to claim 6, wherein the second acceleration determining unit calculates a distance from a point where the host vehicle is running till a point where the road shape ahead of the host vehicle coincides with a predetermined shape, determines whether or not to accelerate the host vehicle after the condition that a calculated distance is within the look-ahead distance has continued more than a predetermined period of time.

8. The vehicle speed control system according to claim 5, wherein the look-ahead distance is calculated according to foreseeing time set by the driver.

9. The vehicle speed control system according to claim 5, wherein a plurality of foreseeing time are stored, and at least one of the stored foreseeing times is selected when the look-ahead distance is calculated.

10. The vehicle speed control system according to claim 5, wherein at least one of a plurality of parameters representing the speed of the host vehicle, the driver's steering rotation, and the driver's accelerator operation is selected, and the foreseeing time is corrected according to the selected parameter and the road shape.

11. A vehicle speed control system, comprising:
a road shape recognition unit which recognizes a road shape;
a target speed setting unit which sets a target speed of the host vehicle according to the road shape;
a speed control unit which controls the speed of the host vehicle according to the target speed;
a parameter detecting unit which detects at least one of parameters representing a driver's steering rotation, a yaw rate of the vehicle, and a lateral acceleration rate of the vehicle;
a first acceleration determining unit which, after the speed control unit has decelerated the host vehicle, determines whether or not to accelerate the host vehicle according to reference parameters based on the road shape and the speed of the host vehicle and parameters detected by the parameter detecting unit; and
a second acceleration determining unit which, after the speed control unit has decelerated the host vehicle, estimates a look-ahead distance according to the speed of the host vehicle and a foreseeing time, and determines whether or not to accelerate the host vehicle according to the road shape ahead of the host vehicle and the look-ahead distance,
wherein, when the first acceleration determining unit has determined to accelerate the host vehicle, the target speed setting unit sets a target speed of the host vehicle according to a first acceleration rate, or when the second acceleration determining unit has determined to accelerate the host vehicle, the target speed setting unit sets a target speed for the host vehicle according to a second acceleration rate.

* * * * *